United States Patent [19]
Revilla et al.

[11] Patent Number: 5,925,118
[45] Date of Patent: Jul. 20, 1999

[54] METHODS AND ARCHITECTURES FOR OVERLAPPED READ AND WRITE OPERATIONS

[75] Inventors: Juan Guillermo Revilla, Cary; Thomas Andrew Sartorius, Raleigh; Mark Michael Schaffer, Cary, all of N.C.

[73] Assignee: International Business Machines Corporation, Armonk, N.Y.

[21] Appl. No.: 08/729,555

[22] Filed: Oct. 11, 1996

[51] Int. Cl.$^6$ ................................................ G06F 13/14
[52] U.S. Cl. .......................... 710/110; 709/208; 710/107; 710/119
[58] Field of Search ..................................... 395/325, 425, 395/290, 200.38, 128.04, 299; 370/60.1, 85.1; 365/207; 709/208; 710/110, 119, 107

[56] References Cited

U.S. PATENT DOCUMENTS

| | | | |
|---|---|---|---|
| 4,954,992 | 9/1990 | Kumanoya et al. | 365/207 |
| 5,060,145 | 10/1991 | Scheuneman et al. | 364/200 |
| 5,193,163 | 3/1993 | Sanders et al. | 395/425 |
| 5,237,567 | 8/1993 | Nay et al. | 370/85.1 |
| 5,278,957 | 1/1994 | Chan | 395/250 |
| 5,428,753 | 6/1995 | Kondo et al. | 395/325 |
| 5,490,265 | 2/1996 | Riches, Jr. et al. | 395/496 |
| 5,550,820 | 8/1996 | Baran | 370/60.1 |
| 5,596,708 | 1/1997 | Weber | 395/182.04 |
| 5,710,891 | 1/1998 | Normoyle et al. | 395/299 |

OTHER PUBLICATIONS

IBM Technical Disclosure Bulletin, v. 32, No. 4A, Sep. 1989 "Dual Bus Architecture".

*Primary Examiner*—Ayaz R. Sheikh
*Assistant Examiner*—Frantz Blanchard Jean
*Attorney, Agent, or Firm*—Daniel E. McConnell; Steven B. Phillips; Myers, Bigel, Sibley & Sajovec

[57] ABSTRACT

A communication system and method of communicating including a slave function connected to a master function by a single address bus, a write data bus and a read data bus so as to allow for overlapping multiple cycle read and write operations between the master function and the slave function. Preferably the communication system includes a plurality of slave functions connected to a master function by the single address bus, the write data bus and the read data bus. A plurality of master functions may be connected to the slave functions through a bus arbiter connected to the plurality of master functions by an address bus, a write data bus and a read data bus for each master function. The bus arbiter receives requests for communication operations from the plurality of master functions and selectively transmits the communication operations to the slave functions. In a preferred embodiment of the present invention, the master function and the slave function are further connected by a plurality of transfer qualifier signals which may specify whether the operation is a read or a write operation, the size of the transfer, the direction of the transfer or the type of transfer so as to further facilitate multiple cycle transfers with a single address specified on the single address bus.

39 Claims, 5 Drawing Sheets

METHODS AND ARCHITECTURES FOR OVERLAPPED READ AND WRITE OPERATIONS

FIELD OF THE INVENTION

The present invention relates generally to communications interfaces. More particularly the present invention relates to communications interfaces for communication between a master function and slave function.

BACKGROUND OF THE INVENTION

Communications interfaces for both communications between processors and memory and for communication with input/output devices have traditionally been constrained by the physical characteristics of the devices which the interface interconnects. For example, limitations in physical connections (e.g input/output pins) have caused interface architectures to maximize throughput in the connection constrained environment. Thus, these communication architectures have sought to reduce the number of buses and, therefore, the number of connections required while still providing acceptable data throughput.

Examples of previous architectures for input/output and memory access include those described in IBM Technical Disclosure Bulletin ("IBM TDB") Vol. 32, No. 4A, September 1989. As described in the IBM TDB, throughput to both memory and I/O devices is increased by duplicating both address, data and control buses. As described in the IBM TDB, a single processor controls both buses and only a single operation can occur on either bus. Thus, the throughput is increased but at the expense of doubling the number of connections required between the processor and the memory and I/O devices. Furthermore, only a single processor is described as initiating operations.

U.S. Pat. No. 5,278,957 ("the '957 patent") to Chan describes a data transfer circuit where 100% data integrity is not required. The '957 patent describes a circuit for transferring data from one bus system to another bus system. The two bus systems perform operations with no handshaking for write operations or a minimum of handshaking for read operations. Accordingly, the data transfer circuit of the '957 patent is unsuitable for memory access or input/output where data integrity is required. For example, the system of the '957 patent may be unsuitable for operations such as fetching instructions from memory. Furthermore, the system of the '957 patent does not indicate how read or write operations are initiated or how read or write addressing is carried out.

Additionally, U.S. Pat. No. 5,060,145 ("the '145 patent") to Scheuneman et al. describes a memory access system which allows for one transfer, either read or write, per cycle. The '145 patent describes separate buses for reads and writes and which for each cycle of a read or write operation have a corresponding address cycle on an address bus. Thus, for every cycle of a read or write operation there is a corresponding address cycle. While the system of the '145 patent does allow for some pipelining of transfers it does not allow for multiple cycle transfers of opposite directions based upon a single address placed on the address bus. Thus, the data throughput of the system of the '145 patent may be limited by the address bus data rate. Accordingly, the system of the '145 patent does not achieve as high a degree of throughput as is theoretically possible.

As the density of integrated circuits increased, more and more functions of a processing system have been incorporated in a single integrated circuit. However, the same communications systems utilized for I/O bound multiple component systems, such as those systems described above, have typically been incorporated into single integrated devices. With the increased integration of devices, a different set of constraints are placed on communications interfaces. For example, even with integrated devices there is still a limitation on the number of "buses" which may be implemented within a single integrated circuit, as circuit "real estate" may limit the ability to interconnect functions within a single device. Accordingly, there still exists a need for new communication systems which may exploit the advantages of increased integration of functions in a single device.

OBJECTS AND SUMMARY OF THE INVENTION

In view of the above it is one object of the present invention to provide a communication interface which allows for high throughput of data between functions.

A further object of the present invention is to exploit the advantages of high density integrated circuits to increase the communication efficiency of functions implemented on those integrated circuits.

Yet another object of the present invention is to provide multi-purpose communication systems and methods capable of incorporating both memory and I/O devices in a single communications interface.

Another object of the present invention is to provide communication systems and methods capable of communication with multiple functions simultaneously.

In view of the objects, the present invention provides a communication system for use in processing systems and the like. The communication system includes a master function and a slave function connected to the master function by a single address bus, a write data bus and a read data bus so as to allow for overlapping multiple cycle read and write operations. Preferably the communication system includes a plurality of slave functions connected to a master function by the single address bus, the write data bus and the read data bus. Furthermore, the communication system may also include a plurality of master functions which are connected to the slave functions through a bus arbiter connected to the plurality of master functions by an address bus, a write data bus and a read data bus for each of the plurality of master functions. The bus arbiter is also connected to the plurality of slave functions by a single address bus, a write data bus and a read data bus such that the bus arbiter receives requests for communication operations from the plurality of master functions and selectively transmits the communication operations to the slave functions. In a preferred embodiment of the present invention, the master function and the slave function are further connected by a plurality of transfer qualifier signals which may specify, among other things, the size of the transfer, the direction of the transfer or the type of transfer.

By providing a communication system which provides multiple cycle read and write operations and yet still utilizes a single address bus, the present invention may dramatically increase throughput with only the addition of a data bus. By increasing the number of control signals between the master and slave functions, the present invention is particularly well suited for use in a single integrated circuit as data transfer rate is more effectively increased by the addition of a few selective control signals than by replication of another address bus. Thus, an increase in data transfer of up to 2 times the rate of a single data bus system may be theoretically achieved through the use of the present invention without the need to duplicate both the address and data buses. Furthermore, by allowing for multiple cycle read or write operations with a single address on the address bus for each multiple cycle operation the likelihood of the address bus becoming the limiting factor in the throughput of the system is reduced. Thus, the throughput of the system may approach that of duplicate read and write buses without the need for duplicating the address bus for both the read and write data buses and, thereby, saving the real estate which would otherwise be required for a duplicate bus system.

The present invention also provides methods of synchronous communication to slave functions interconnected by a single address bus, a write data bus and a read data bus. An address corresponding to an initial address from which data is to be read from a function is transmitted on the single address bus to the slave functions. Similarly, an address corresponding to an initial address for data to be written to a function is transmitted on the single address bus to the slave functions. Write data to be written to a function is transmitted on the write data bus and read data corresponding to the read address is received from the read data bus. Furthermore, the transmitting of write data and the receiving of read data are carried-out concurrently such that at least one cycle of a read operation and one cycle of a write operation are carried out simultaneously.

In a more particular embodiment of the present invention, the address corresponding to an initial address from which data is to be read from a function is transmitted until an acknowledge is received from the slave function. Furthermore, the initial address corresponding to the address for data to be written to a function may also be transmitted on the single address bus until an acknowledge is received from a slave function.

In an alternative embodiment of the present invention, transfer qualifying information is also transmitted to the slave functions when an initial address is transmitted on the address bus. The transfer qualifying information may include information selected from the group consisting of the size of the transfer, the direction of the transfer and the type of transfer.

In a further embodiment of the present invention, a method of communicating with a master function connected to slave functions by a single address bus, a write data bus and a read data bus is provided. In such an embodiment, the slave functions receive on the single address bus an initial address corresponding to a read operation and also receive on the single address bus an initial address corresponding to a write operation. Data to be written to a function is received on the write data bus. Read data associated with the read address is transmitted on the read data bus such that at least one cycle of a read operation corresponding to the transmission of read data and one cycle of a write operation corresponding to the receipt of write data are carried out simultaneously.

In another embodiment of the present invention at least one of the slave functions carries out the step of acknowledging receipt of the initial address corresponding to the write operation and at least one of the slave functions acknowledges receipt of the initial address corresponding to the read operation. Furthermore, a single slave function may acknowledge both the read address and the write address so as to allow concurrent read and write operations from the same slave function.

In one particular embodiment of the present invention a write complete signal is transmitted to signify a final cycle of valid write data on the write data bus. Furthermore, a write data acknowledge may be transmitted for each cycle of valid data on the write data bus received from the write data bus.

Similarly, a read complete signal may be transmitted to signify a final cycle of valid data on the read data bus. The read complete signal may be transmitted during the final cycle of valid data on the read data bus. Alternatively, the read complete signal may be transmitted during the cycle immediately prior to the final cycle of valid data on the read data bus. A read data acknowledge signal may also be transmitted for each cycle of valid data transmitted on the read data bus.

As will be appreciated by those of skill in the art, the present invention may further take the form of slave, and/or master functions capable of carrying out the above described operations.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method or data processing system. Accordingly, the present invention may take the form of an entirely hardware embodiment, an entirely software embodiment or an embodiment combining software and hardware aspects.

Figure 1:
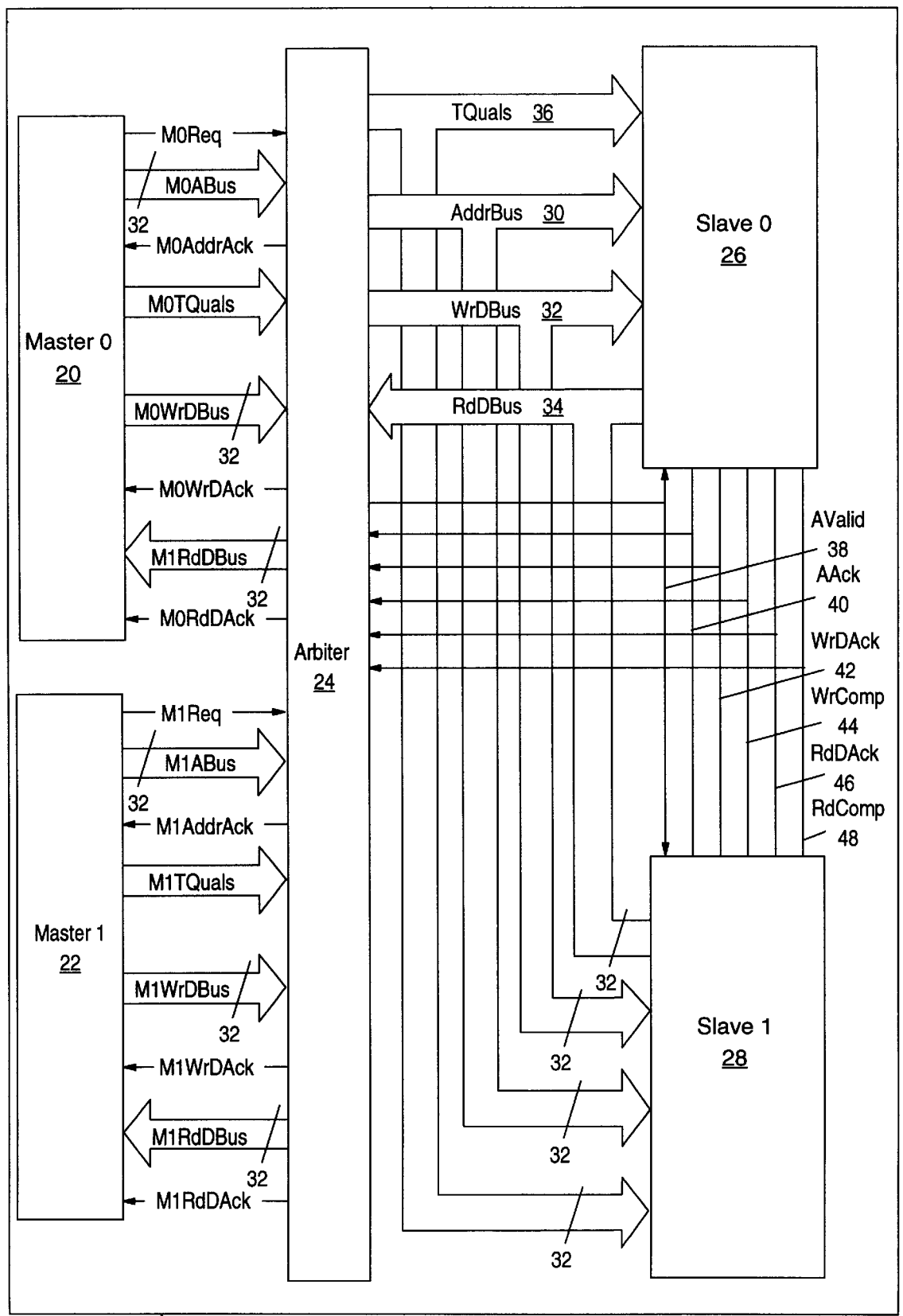
FIG. 1 is a block diagram of a system utilizing the present invention.

FIG. 1 illustrates one embodiment of the present invention. As seen in FIG. 1 a master function 20 is connected to an arbiter 24. A slave function 26 is also connected to the arbiter 24. As FIG. 1 shows, the present invention may facilitate interconnection of a plurality of master functions depicted as Master 0 20 and Master 1 22. Similarly, the present invention may also facilitate interconnection of a plurality of slave devices as is illustrated in FIG. 1 by Slave 0 26 and Slave 1 28. Preferably, at least one slave function, one master function and the arbiter are contained within a single integrated circuit. More preferably, all master functions, all slave functions and the arbiter are contained within a single integrated circuit 10.

As seen in FIG. 1, the slave devices 26 and 28 are interconnected by a single address bus (AddrBus) 30. The slave devices 26 and 28 are also connected by a write data bus (WrDBus) 32 and a read data bus (RdDBus) 34. The slave functions 26 and 28 also receive a group of signals referred to herein as transfer qualifiers (TQuals) 36. Transfer qualifiers include information about whether the transfer for which an address is present on the address bus is a read or write transfer, the size of the transfer, the type of transfer (e.g. byte aligned, line or burst) byte enables for the transfer, the priority or order of the transfer, speculative memory access information or other information about a particular transfer. One detailed example of a transfer qualifier is provided in commonly assigned and concurrently filed U.S. patent application Ser. No. 08/731,350 entitled METHOD AND APPARATUS FOR CONTROL OF SPECULATIVE MEMORY ACCESSES (Attorney Docket No. RA9-96-065) the disclosure of which is incorporated herein by reference as if set forth fully. Because the transfer qualifier information is provided to the slave functions, multiple cycle transfers may be initiated with a single address. For example, by providing an initial address to a slave device and providing the type of transfer and number of bytes to be transferred a block of data may be transferred to or from the slave function over multiple cycles on the data buses with only a single address placed on the address bus.

The slave functions 26 and 28 are also connected to the arbiter 24 by a series of control signals. These signals include an address valid signal (AValid) 38 which is received by the slave functions 26 and 28 and which is asserted by the arbiter 24 when a valid address is on AddrBus 30. The slave functions 26 and 28 also drive an address acknowledge signal (AAck) 40 to the arbiter 24 when a slave function receives an address within the range of addresses assigned to the slave function. The slave function receiving data from WrDBus 32 also asserts a write data acknowledge signal (WrDAck) 42 for each cycle of data properly received by the slave. During the last cycle of valid data on WrDBus 32 the slave function asserts a write complete signal (WrComp) 44 to indicate the final cycle of the transfer.

In a similar fashion to the write control signals, the slave function placing read data on RdDBus 34 asserts a read data acknowledge signal (RdDAck) 46 for each cycle of valid data on RdDBus 34. The slave function also asserts a read complete signal (RdComp) 48 on either the last or the second to last cycle of the transfer. Whether RdComp 48 is asserted on the last cycle or the second to last cycle is dependent upon whether the slave function is utilizing an early read complete protocol. Because of the latency of a read operation, the slave function performing a read operation and utilizing an early read complete protocol may signal completion of the operation on the cycle prior to completion of the read operation equal to the latency of the slave functions. Thus, if it takes a slave function one cycle after receiving an address to drive data on RdDBus (the latency period of the salve functions), then the slave function may indicate completion of the read operation one cycle early without the possibility of collision of data on the read data bus.

Turning to the interconnection of the master functions 20 and 22, each master is connected to the arbiter 24 by its own set of buses and control signals. As seen in FIG. 1 each master function 20 and 22 has its own request line (M0Req and M1Req) to the arbiter 24. The master function asserts the request line to notify the arbiter of a request for a read or write operation. Each master function 20 and 22 also has its own address bus (M0ABus and M1ABus), write data bus (M0WrDBus and M1WrDBus), read data bus (M0RdDBus and M1RdDBus) and transfer qualifiers (M0TQuals and M1TQuals). The master functions 20 and 22 transmit the initial address on the address bus (M0ABus and MABus) and the transfer qualifiers (M0TQuals and M1TQuals) while the request is asserted and until the master function asserting the request (20 or 22) receives an acknowledge signal (M0AddrAck and M1AddrAck) from the arbiter 24. As discussed below, the master functions 20 and 22 may also transmit the write data on the write data bus (M0WrDBus and M1WrDBus) when the request is asserted if the operation requested is a write operation. The master functions 20 and 22 also receive read data acknowledge (M0RdDAck and M1RdDAck) and write data acknowledge (M0WrDAck and M1WrDAck) signals from the arbiter 24. As discussed more fully below, these buses and control signals carry out essentially the same functions between the master functions 20 and 22 and the arbiter 24 as their corresponding buses and control signals do between the slave functions 26 and 28 and the arbiter 24.

Operation of the present invention will now be described with reference to the timing charts of FIG. 2 and FIG. 3 and the flowcharts of FIG. 4 and FIG. 5. It will be understood that certain blocks of the flowchart illustrations, and combinations of blocks in the flowchart illustration, can be implemented by computer program instructions. These computer program instructions may be executed by a general purpose processor or other programmable data processing apparatus to produce a machine, such that the instructions which execute on the general purpose processor or other programmable data processing apparatus create means for implementing the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or combinations of special purpose hardware and computer instructions.

Figure 3:
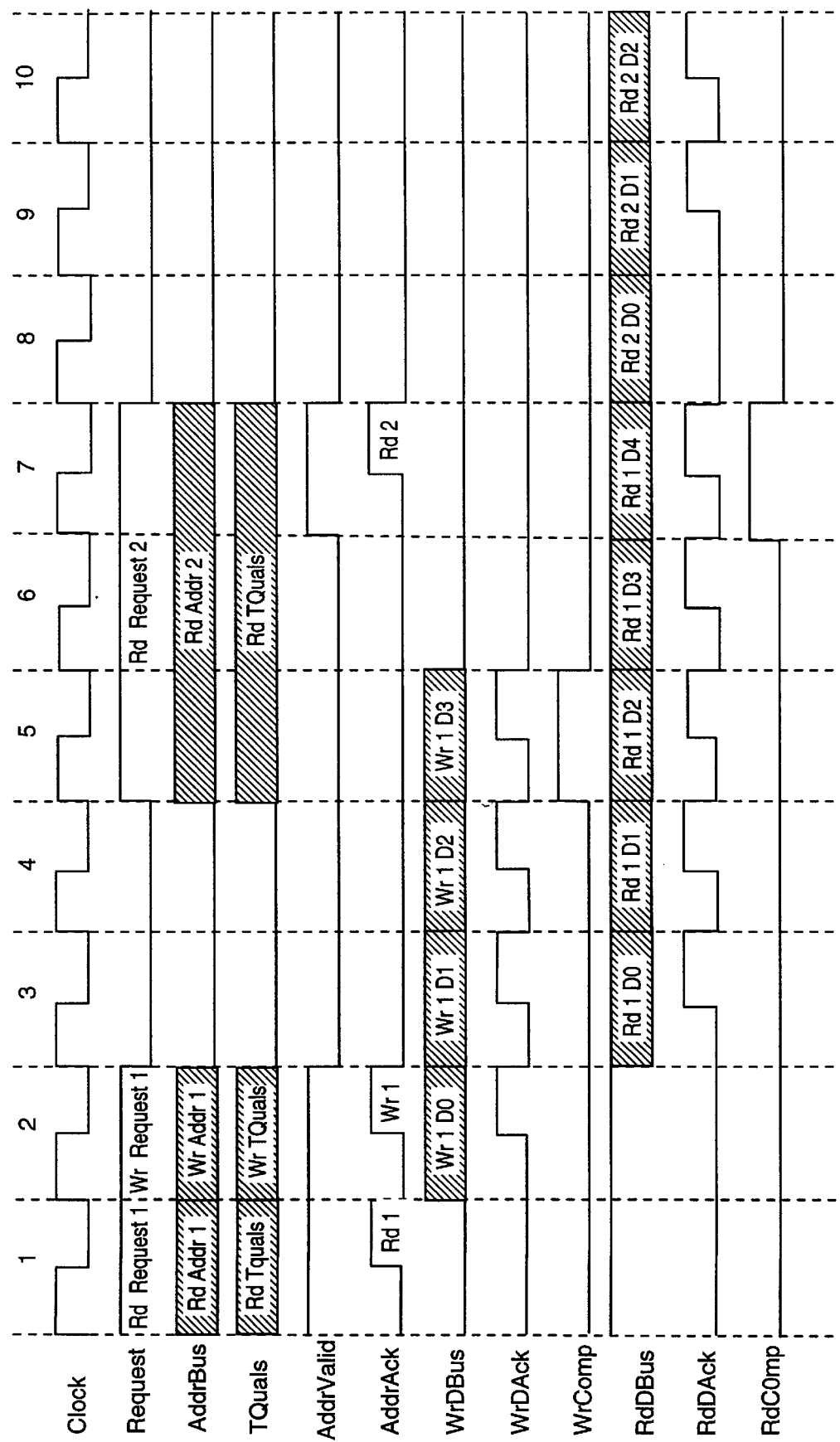
FIG. 3 is a timing diagram illustrating overlapped operations in a system according to an alternative embodiment of the present invention.
Figure 4:
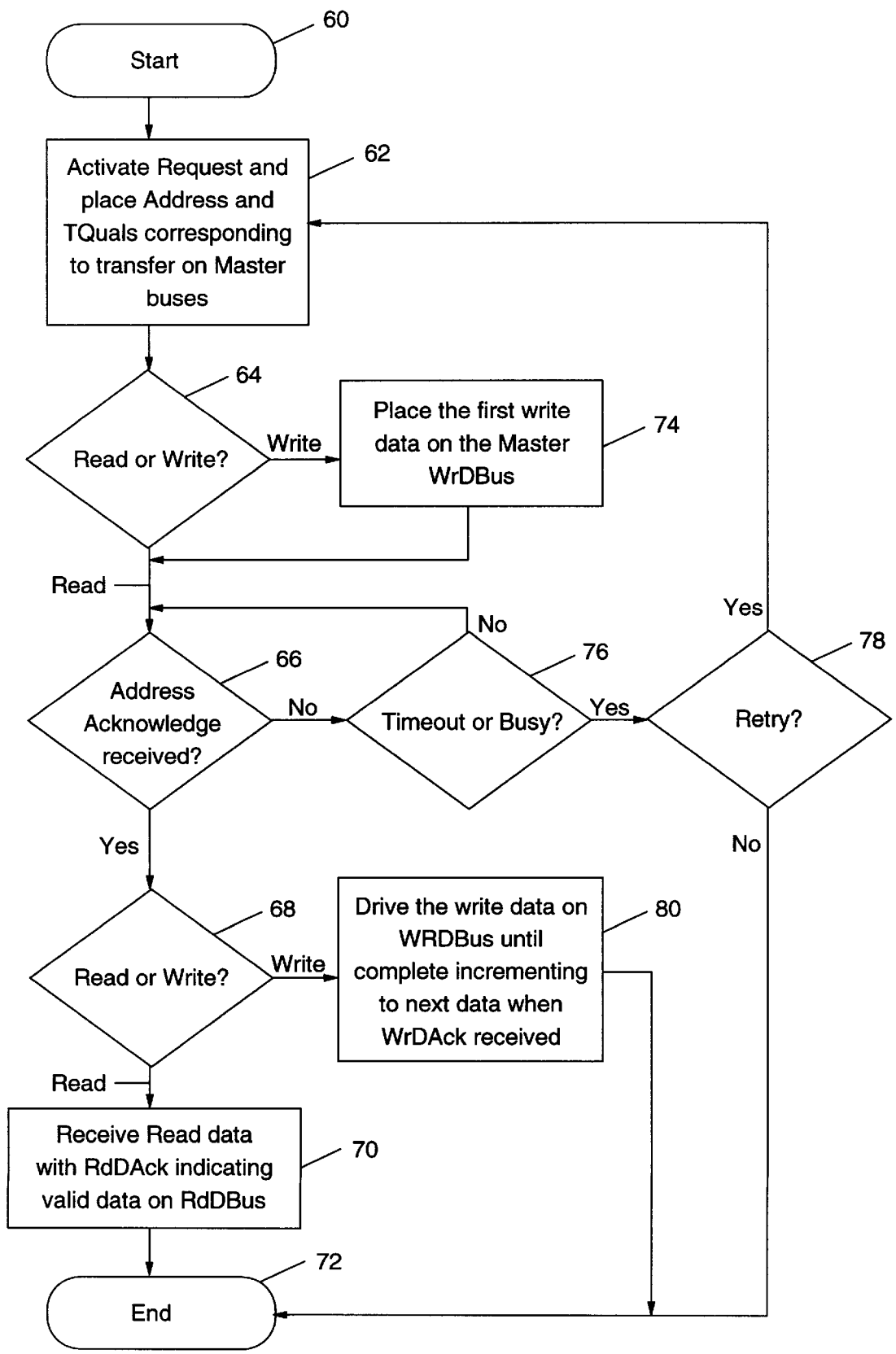
FIG. 4 is a flow chart illustrating the operation of a master function according to the present invention.

As is seen in FIG. 4, the master function 20 begins a transfer, either read or write, by activating M0Req and placing the address and transfer qualifiers on M0ABus and M0TQuals as seen in blocks 60 and 62. The activation of the request is seen in FIG. 2 and FIG. 3 as the Request signal going to a "high" or "1" state in cycle 1. In the present example, the request is for a read operation and, as seen in blocks 64 and 66, the master function waits for an address acknowledge (M0AddrAck or M1AddrAck) from a slave function. When the arbiter 24 receives the request from a master function, if there are no other higher priority pending requests the arbiter drives the address onto AddrBus 30, provides the transfer qualifier information on TQuals 36 and asserts A valid 38. These operations are seen in FIG. 2 and FIG. 3 as the data being presented on AddrBus as Rd Addr 1, data present on TQuals as Rd TQuals and the AddrValid signal going to the "high" or "1" state during cycle 1.

Figure 5:
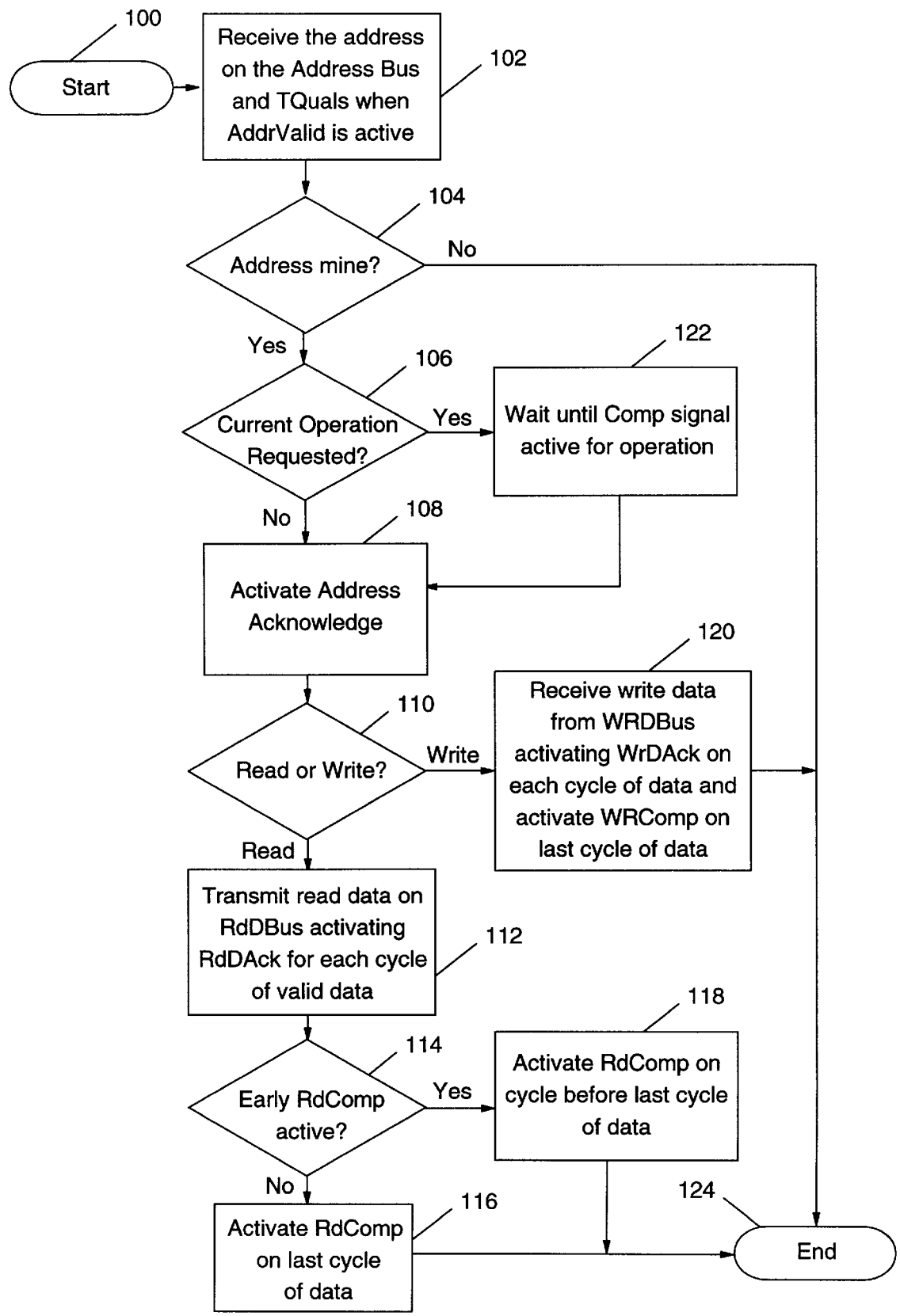
FIG. 5 is a flow chart illustrating the operation of a slave function according to the present invention.

As seen in FIG. 5 when a slave function begins operation it receives the AddrValid signal and receives the address from AddrBus 30 and the transfer qualifier information from TQuals 36, as seen in blocks 100 and 102. The slave function then determines if the address on the address bus is an address to which the slave is to respond (block 104). If the slave is to respond then the slave function determines if there is a current operation which prevents it from responding to the address as seen in block 106. If there is a current operation, then the slave function may wait until that operation completes and then activate the address acknowledge signal AAck 40 (blocks 106, 122 and 108). If there is no pending operation then the slave function simply activates the address acknowledge signal Aack 40 (block 108). For purposes of the present example, the address of the read operation Rd Addr 1 is acknowledged by slave function 26. The assertion of the address acknowledge by slave function 26 is seen in FIG. 2 and FIG. 3 by the AddrAck signal going to a "high" or "1" state during cycle 1 (Rd 1). This signal is then provided by the arbiter 24 to the requesting master function 20.

If the slave function 26 asserts the address acknowledge signal the slave function 26 also examines the data on TQuals to determine if the operation is a read or a write as seen in block 110. Because the operation is a read operation the slave function 26 obtains the requested data (size, type and other specification of the read operation being provided by TQuals) and transmits the data on RdDBus as seen in block 112. As can be seen in FIG. 2 and FIG. 3 in the present example, the read data is transmitted on cycles 3 through 7 as Rd 1 D0, Rd 1 D1, Rd 1 D2, Rd 1 D3, and Rd 1 D4. The data is first presented on RdDBus 34 from the slave function 26 on the second cycle after the address acknowledge from the slave function 26. Accordingly, in the present example, the read latency period of the slave function 26 is 1 cycle.

Figure 2:
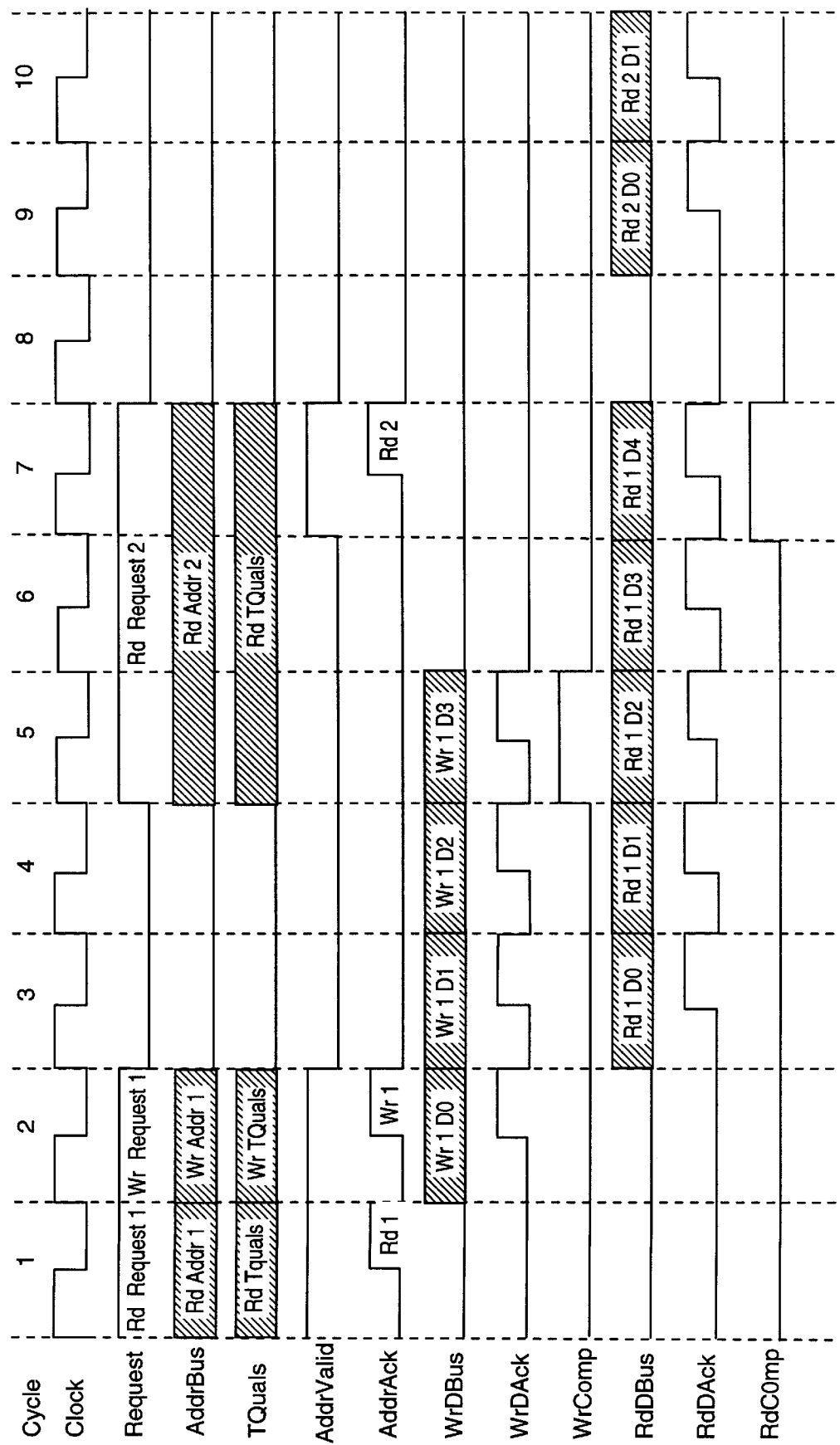
FIG. 2 is a timing diagram illustrating overlapped operations in a system according to the present invention.

As is further illustrated in FIG. 2 and FIG. 3 with each cycle of valid read data the slave function asserts RdDAck 46. Thus, during each of cycles 3 through 7 the RdDAck signal is shown as entering the "high" or "1" state. The data on RdDBus 34 and the RdDAck signal 46 are also driven by the arbiter 24 to the master function 20 on the master read data bus M0RdDBus and M0RdDAck for each cycle of valid data.

The read operation completes by the slave function 26 asserting the RdComp signal 48. This signal may be asserted either on the last cycle of valid read data or, when the slave function is in an early read complete mode, on the cycle corresponding to the last read cycle minus the read latency period of the slave functions. As seen in FIG. 5, the slave function 26 determines if early read complete is active (block 114) and if not activates RdComp 48 on the last cycle of the read operation with valid data (block 116) which completes the read operation (block 124). FIG. 2 illustrates the timing of a read operation when the slave function is not employing early read complete. Thus, as seen in FIG. 2 the slave function activates RdComp 48 in cycle 7 which is illustrated as RdComp 48 entering the "high" or "1" state.

If a request for a read operation is pending on the address bus at the time of a read operation, as is illustrated in FIG. 2 by Rd Request 2, Rd Addr 2 and Rd TQuals in cycles 6 and 7, then the assertion of RdComp 48 will cause the arbiter 24 to assert AValid 38 which allows an address acknowledge to issue from a slave function. Thus, as seen in FIG. 2, AddrAck is asserted in cycle 7 (Rd 2) to begin a second read operation. This read operation proceeds as described above with the read data (Rd 2 D0 and Rd 2 D1) being placed on RdDBus 34 in cycles 9 and 10, one cycle after the assertion of the address acknowledge. Accordingly, as is illustrated in FIG. 2, the read data bus may be idle for the number of cycles equal to the read latency period of the slave function, which in the present example is one cycle.

Because the arbiter 24 utilizes the RdComp 48 signal to determine when to assert AValid 38, the timing of the RdComp 48 signal may be altered to compensate for the latency period of read operations and thus allow back-to-back read operations without an idle cycle on RdDBus 34. Such a compensation may be accomplished, as seen in FIG. 5, by the slave function determining if early read completion is active (block 114) and if so asserting RdComp on the cycle before the last cycle of the transfer (block 118) to compensate for the 1 cycle read latency period of the present example. FIG. 3 illustrates the early assertion of RdComp 48 in that RdComp 48 is asserted in cycle 6, one cycle before the end of the read operation. The assertion of RdComp is illustrated as RdComp entering the "high" or "1" state in cycle 6 of FIG. 3. By providing for the early assertion of the read complete signal, as seen in FIG. 3, the idle time of the read data bus may be eliminated. Thus, the data for the second read cycle (Rd 2 D0, Rd 2 D1 and Rd 2 D2) begins to be placed on RdDBus 34 on the next cycle after completion of the first read operation, which n the present example is cycle 8.

With respect to the master function 20, as seen in FIG. 4, if the master function does not receive the address acknowledge, then the master function continues to wait until it determines that the slave is busy or has the operation times out (blocks 66 and 76). If the slave is busy or the operation times out, the master function may retry the operation (blocks 78 and 62) or may terminate the operation (blocks 78 and 72). If an address acknowledge is received for a read operation, the master function 20 receives the read data from the read data bus M0RdDBus with M0RdDAck indicating valid data on the read data bus (blocks 68 and 70). The master function continues to receive data until the operation is complete (block 72).

A write operation begins in the same manner as a read operation with a master function requesting an operation from the arbiter 24. However, as is seen in FIG. 4, for a write operation the master function not only provides the address and transfer qualifier information to the arbiter 24, the master function also places the first word of the data to be written on the write data bus, which, for the present example, will be M1WrDBus corresponding to a write request from Master 1 22 (blocks 64 and 74). Thus, as seen in FIG. 2 and FIG. 3 a write operation begins by activating the request (Wr Request 1) which, if the slave write data bus is available, the arbiter 24 passes to the slave functions by activating AValid 38, The arbiter 24 also places the initial write address on the address bus (Wr Addr 1), places the qualifier information on TQuals (Wr TQuals) and places the first write data on the write data bus (Wr 1 D0) which is illustrated as occurring in cycle 2.

As with the read operation, the slave functions receive the address and the transfer qualifiers when AValid is asserted (block 102) and if the address is associated with the slave function (block 104) and there is no pending operation (block 106), the slave function activates address acknowledge Aack 40 (block 108). In addition to the activation of address acknowledge, for a write operation, the slave function also receives the data on WrDBus 32 and activates WrDAck 42 for each cycle of data received (blocks 110 and 120). The master function continues to place the write data on the master write data bus as the data is acknowledged by the slave function until the completion of the write operation (block 80).

The activation of address acknowledge and WrDAck are illustrated in FIG. 2 and FIG. 3 with address acknowledge being activated in cycle 2 (Wr 1) and WrDAck being activated during cycles 2 through 5. As with previous illustrations of the assertion of signals, the address acknowledge and WrDAck are illustrated as asserted in the "high" or "1" state in FIG. 2 and FIG. 3.

As with the read operation, the slave function asserts WrComp 44 on the last cycle of the write operation (block 120) as is seen in cycle 5 of FIG. 2 and FIG. 3. WrComp is illustrated as asserted in the "high" or "1" state. With the write operation, however, unlike the read operation, the write complete signal need not be asserted prior to the last cycle of the operation because there is no latency with the write operation. Because data is driven on the write data bus during the same cycle as the address, the arbiter 24 must delay activating address valid until one cycle after receiving the write complete signal. Accordingly, data for write operations may appear on the write data bus on every cycle.

As is clear from FIG. 2 and FIG. 3 the present invention allows for transfers where multiple cycle read and write operations occur concurrently on the read data bus and the write data bus such that data is transferred simultaneously on the two data buses. This simultaneous transfer on the two buses need not be not limited by the address bus as a single initial address on the address bus may initiate a multiple cycle operation. Accordingly, given an even distribution of read and write operation requests such that a read or write operation request is always pending during the execution of a current read and write operation, a system according to the present invention may achieve up to twice the steady-state throughput of a single bus system without the requirement of duplicate address buses for read and write data buses.

As used herein the term addresses to an initial address which may be the first address of the transfer, an address contained within a predefined block size to be transferred or which may be an address of an initial byte or subunit of the data bus to be transferred. Furthermore, as will be appreciated by those of skill in the art, other methods of providing address information in a single cycle to effect a multi-cycle transfer may be utilized while still obtaining the benefits of the present invention.

While the present invention has been described with respect to positive logic such that a positive voltage corresponds to an active of "1" state of a signal, as will be appreciated by those of skill in the art, the present invention may also be implemented utilizing any suitable means of signifying an active and inactive state.

Furthermore, the present invention has been described with respect to a plurality of master functions and a plurality of slave functions. However, in the event that a single master function is all that is present in a system utilizing the present invention, then the arbiter function of the present invention need not be implemented as a separate function as described above in that the arbiter does not arbitrate between competing masters for the common slave buses. Accordingly, in the event of a single master function, the master function would always have access to the slave buses thus eliminating the need for an arbiter function.

With respect to the arbiter function described above, as will be appreciated by those of skill in the art, the arbiter function may utilize any number of known methods of selecting between competing requests of the master functions. Implementation of the arbiter function, therefore, may be dependent upon the desired arbitration scheme. A simple priority scheme where a priority is associated with a request which is conveyed to the arbiter may be adequate in many situations. Such a scheme is particularly attractive with the present invention as the arbiter function primarily provides a steering function between the slave buses and the individual master buses and, therefore, requires little circuitry to implement. Accordingly, with a simple priority arbitration scheme the area in an integrated circuit utilized by the arbiter function may be kept correspondingly small.

While the present invention has been described with respect to dedicated master and slave functions, as will be appreciated by those of skill in the art, the present invention may be utilized in a peer-to-peer manner with a master and slave function being defined for each transfer request. In such a case, each of the functions should be interconnected so as to provide bi-directional buses so as to drive the address, write and read buses as well as receive information from those buses. In such a system, an arbiter need not be utilized. Accordingly, the present invention should not be construed as requiring an arbiter in all embodiments.

In the drawings, specification and examples, there have been disclosed typical preferred embodiments of the invention and, although specific terms are employed, these terms are used in a generic and descriptive sense only and not for purposes of limitation, the scope of the invention being set forth in the following claims.

That which is claimed is:

1. A method of synchronous communication to slave functions, the method comprising:

transmitting to the slave functions on a single address bus an address corresponding to an initial read address from which data is to be read from a function;

transmitting to the slave functions on the single address bus an address corresponding to an initial write address for data to be written to a function;

transmitting at least two cycles of write data associated with the initial write address to be written to a function on a write data bus;

receiving at least two cycles of read data associated with the initial read address on a read data bus wherein the read data bus is separate from the write data bus; and wherein said step of transmitting at least two cycles of write data and said step of receiving at least two cycles of read data are carried out concurrently such that at least one cycle of a read operation corresponding to said step of receiving read data and one cycle of a write operation corresponding to said step of transmitting write data are carried out simultaneously.

2. The method according to claim 1, wherein said step of transmitting to the slave functions on a single address bus an address corresponding to an initial read address from which data is to be read from a function comprises transmitting to the slave functions on a single address bus an initial address corresponding to the address from which data is to be read from a function until an acknowledge is received from the slave function; and wherein said step of transmitting to the slave functions on a single address bus an initial write address corresponding to the address for data to be written to a function comprises transmitting to the slave functions on a single address bus an initial address corresponding to the initial address for data to be written to a function until an acknowledge is received from a slave function.

3. The method according to claim 1, further comprising the step of receiving a write complete signal to signify a final cycle of valid write data on the write data bus.

4. The method according to claim 3, further comprising the step of receiving a write data acknowledge for each cycle of valid data transmitted on the write data bus.

5. The method according to claim 1, further comprising the step of receiving a read complete signal to signify a final cycle of valid data on the read data bus.

6. The method according to claim 5, further comprising the step of receiving a read data acknowledge signal for each cycle of valid data transmitted on the read data bus.

7. The method according to claim 5, wherein said step of receiving a read complete signal comprises receiving a read complete signal during the final cycle of valid data on the read data bus.

8. The method according to claim 5, wherein the step of receiving a read complete signal comprises receiving a read complete signal during the cycle immediately prior to the final cycle of valid data on the read data bus.

9. The method according to claim 1, further comprising the step of transmitting transfer qualifying information to the slave functions when an initial address is transmitted on the address bus.

10. The method according to claim 9 wherein the transfer qualifying information includes information selected from the group consisting of the size of the transfer, the direction of the transfer and the type of transfer.

11. A method of synchronous communications with master functions, the method comprising at least one slave function:

receiving on a single address bus an initial read address corresponding to a read operation;

receiving on the single address bus an initial write address corresponding to a write operation;

receiving at least two cycles of write data associated with the initial write address and to be written to a function on a write data bus;

transmitting at least two cycles of read data associated with the initial read address on a read data bus, wherein the read data bus is separate from the write data bus; and wherein said step of receiving at least two cycles of write data and said step of transmitting at least two cycles of read data are carried out concurrently such that at least one cycle of a read operation corresponding to said step of transmitting read data and one cycle of a write operation corresponding to said step of receiving write data are carried out simultaneously.

12. The method according to claim 11, wherein at least one slave function carries out the step of acknowledging receipt of the initial read address corresponding to the read operation; and wherein at least one slave function carries out the step of acknowledging receipt of the initial write address corresponding to the write operation.

13. The method according to claim 12, wherein the at least one slave function which acknowledges the initial read address is also the at least one slave function which acknowledges the initial write address so as to cause concurrent read and write operations from a single slave function.

14. The method according to claim 11, further comprising the step of transmitting a write complete signal to signify a final cycle of valid write data on the write data bus.

15. The method according to claim 14, further comprising the step of transmitting a write data acknowledge for each cycle of valid data on the write data bus received from the write data bus.

16. The method according to claim 11, further comprising the step of transmitting a read complete signal to signify a final cycle of valid data on the read data bus.

17. The method according to claim 16, further comprising the step of transmitting a read data acknowledge signal for each cycle of valid data transmitted on the read data bus.

18. The method according to claim 16, wherein said step of transmitting a read complete signal comprises transmitting a read complete signal during the final cycle of valid data on the read data bus.

19. The method according to claim 16, wherein the step of transmitting a read complete signal comprises transmitting a read complete signal during the cycle immediately prior to the final cycle of valid data on the read data bus.

20. The method according to claim 11, further comprising the step of receiving transfer qualifying when an initial address is transmitted on the address bus.

21. The method according to claim 20 wherein the transfer qualifying information includes information selected from the group consisting of the size of the transfer, the direction of the transfer and the type of transfer.

22. A master function for communicating with slave functions over a single address bus, a write data bus and a read data bus separate from the write data bus, the master function comprising:

means for transmitting to the slave functions on the single address bus an initial address corresponding to the initial address from which data is to be read from a function;

means for transmitting to the slave functions on the single address bus an initial address corresponding to the initial address for data to be written to a function;

means for transmitting at least two cycles of write data associated with the initial address corresponding to the initial address for data to be written to a function on the write data bus;

means for receiving at least two cycles of read data corresponding to the read address on the separate read data bus; and wherein said means for transmitting write data and said means for receiving read data are capable of transmitting write data and receiving read data concurrently such that at least one cycle of a read operation and one cycle of a write operation are carried out simultaneously.

23. The master function according to claim 22, wherein said means for transmitting to the slave functions on the single address bus an initial address corresponding to the initial address from which data is to be read from a function comprises means for transmitting to the slave functions on the single address bus an initial address corresponding to the initial address from which data is to be read from a function until an acknowledge is received from the slave function; and wherein said means for transmitting on the single address bus an initial address corresponding to the initial address for data to be written to a function comprises means for transmitting on the single address bus an initial address corresponding to the initial address for data to be written to a function until an acknowledge is received from a slave function.

24. The master function according to claim 22, further comprising means for transmitting transfer qualifying information when an initial address is transmitted on the address bus.

25. The master function according to claim 24 wherein said transfer qualifying information includes information selected from the group consisting of the size of the transfer, the direction of the transfer and the type of transfer.

26. A slave function for communicating with a master function connected said slave function by a single address bus, a write data bus and a read data bus separate from the write data bus, the slave function comprising:

means for receiving on said single address bus an initial address corresponding to a read operation;

means for receiving on said single address bus an initial address corresponding to a write operation;

means for receiving at least two cycles of data associated with the initial address corresponding to the write operation to be written to a function on said write data bus;

means for transmitting at least two cycles of read data corresponding to the read address on said separate read data bus; and wherein said means for receiving at least two cycles of write data and said means for transmitting at least two cycles of read data are capable of receiving write data and transmitting read data concurrently such that at least one cycle of a read operation and one cycle of a write operation are carried out simultaneously.

27. The slave function according to claim 26, further comprising:

means for acknowledging receipt of an initial address transmitted on said single address bus and corresponding to said slave function.

28. The slave function according to claim 26, further comprising means for transmitting a write complete signal to signify a final cycle of valid write data on the write data bus.

29. The slave function according to claim 28, further comprising means for transmitting a write data acknowledge signal for each cycle of valid data on the write data bus received from the write data bus.

30. The slave function according to claim 26, further comprising means for transmitting a read complete signal to signify a final cycle of valid data on the read data bus.

31. The slave function according to claim 30, further comprising means for transmitting a read data acknowledge signal for each cycle of valid data transmitted on the read data bus.

32. The slave function according to claim 30, wherein said means for transmitting a read complete signal comprises means for transmitting a read complete signal during the final cycle of valid data on the read data bus.

33. The slave function according to claim 30, wherein the means for transmitting a read complete signal comprises means for transmitting a read complete signal during the cycle immediately prior to the final cycle of valid data on the read data bus.

34. The slave function according to claim 26, further comprising means for receiving transfer qualifying when an initial address is transmitted on the address bus.

35. The slave function according to claim 34, wherein the transfer qualifying information includes information selected from the group consisting of the size of the transfer, the direction of the transfer and the type of transfer.

36. A synchronous interface to a master function, the interface comprising:

an address bus comprised of a plurality of address data outputs which transmit address data;

a write data bus comprised of a plurality of write data outputs which transmit write data;

a read data bus, separate from the write data bus, comprised of a plurality of read data inputs which receive read data;

a request output which transmits a request signal signifying that a master function requests a read or write operation be performed;

transfer qualifier outputs which transmit transfer qualifier signals specifying transfer characteristics associated with address data transmitted on said address bus;

an address acknowledge input which receives an acknowledge signal indicating acceptance of address data transmitted on said address bus;

a write data acknowledge input which receives an acknowledge signal indicating receipt of write data transmitted on said write data bus; and a read data acknowledge input, separate from the write data acknowledge input, which receives a read data acknowledge signal identifying cycles when read data is valid on said read data bus.

37. The synchronous interface according to claim 36, wherein said interface is an interface to a plurality of master functions and wherein each of said plurality of master functions is separately connected to an arbiter by said interface so as to replicate said interface for each of said master functions.

38. A synchronous interface to a slave function, the interface comprising:

an address bus comprised of a plurality of address data inputs which receive address data;

a write data bus comprised of a plurality of write data outputs which receive write data;

a read data bus, separate from the write data bus, comprised of a plurality of read data outputs which transmit read data;

an address valid input which receives an address valid signal signifying when valid address data is present on said address bus;

transfer qualifier inputs which receive transfer qualifier information specifying transfer characteristics associated with address data received on said address bus;

an address acknowledge output which transmits an address acknowledge signal acknowledging acceptance of address data received on said address bus;

a read complete output which transmits a read complete signal identifying the last cycle of a read operation;

a write complete output, separate from the read complete output, which transmits a write complete signal identifying the last cycle of a write operation;

a write data acknowledge output which transmits a write data acknowledge signal acknowledging receipt of write data received on said write data bus; and a read data acknowledge output, separate from the write data acknowledge output, which transmits a read data acknowledge signal identifying cycles when read data is valid on said read data bus.

39. The synchronous interface according to claim 38, wherein said interface is an interface connecting a plurality of slave functions and wherein each of said plurality of slave functions single address bus, write data bus, read data bus, address acknowledge output, transfer qualifier inputs, address valid input, write complete output, read complete output, write data acknowledge output and read data acknowledge output are connected to other of said plurality of slave functions to provide a common slave function interface.

* * * * *